United States Patent Office 3,175,927
Patented Mar. 30, 1965

3,175,927
RECONSTITUTED MICACEOUS PRODUCTS
Charles F. Howard, Scotia, N.Y., assignor to General
Electric Company, a corporation of New York
No Drawing. Filed Oct. 25, 1961, Ser. No. 147,430
13 Claims. (Cl. 117—123)

This invention relates to products made from reconstituted micaceous material or mica mat. More particularly, it relates to such materials which are characterized by improved moisture resistance, which are readily machined and which are characterized by enhanced physical properties.

While reconstituted mica laminates or structures and particularly those which are bonded are useful in many applications, such as for electrical insulators and structures which must withstand relatively high temperatures, it has been found that as such structures are used in a moisture-containing environment as above, such moisture causes them to lose their electrical insulating qualities and to tend to delaminate, particularly when exposed to elevated temperatures. Such reconstituted mica structures have also been very difficult to fabricate where precise dimensions and smooth surfaces are required since the edges of the mica mat tend to be rough when dry-machined. Cutting devices, such as tools, are also quickly worn out when cutting such dry mica mat. The use of water-oil emulsions and the like to facilitate machining results in delamination of the material.

From the above, it will be quite evident that there is a need for reconstituted micaceous structures and materials which are characterized by moisture resistance which have durable physical properties and which are readily machined or shaped to the final desired dimensions.

A principal object, therefore, of this invention is to provide bonded reconstituted mica which is possessed of good moisture resistance, good physical characteristics and adaptability to machining.

Briefly stated, the present invention relates to bonded reconstituted mica laminates or structures which are impregnated with wax or wax-like or ceraceous materials whereby the above objects among others, are realized.

Those features of the invention which are believed to be novel are set forth with particularity in the claims appended hereto. The invention will, however, be better understood and further advantages and objects thereof appreciated from a consideration of the following description.

The reconstituted mica which has been found to be useful in connection with this invention can be prepared by any of the processes usual for such materials and includes natural micaceous as well as synthetic micaceous materials which can be reconstituted. For example, it may be prepared according to Patents 2,549,880; 2,614,-055 and 2,709,158, as well as 2,405,576. In general, the above patents relate to the formation of finely divided mica which is capable of being reconstituted by treatment in liquids or by heating which is followed by liquid treatment. The above patents and application are included herein by reference. It will be realized that in addition to the above methods of preparing reconstituted mica, other procedures may be used so long as a micaceous material having virgin surfaces results from the process which permits it to be reconstituted.

The reconstituted mica or mica mat useful in connection with the present invention is normally that which is bonded together with an inorganic binding material such as those selected from the borates, phosphates or combination of such, or other inorganic materials, many of which are described in the art. Organic bonded mica mat can also be used, it being realized that such materials usually will not be so temperature-resistant unless heat resistant binders are used. Among the specific materials which have been found to be useful in bonding reconstituted mica are the borate-phosphate materials set forth in application Serial No. 16,882, filed March 22, 1960, and assigned to the same assignee as this invention.

Generally speaking, the present invention is carried out by impregnating the bonded mica mat with a wax-like or ceraceous material such as paraffin, beeswax, carnauba wax and the like, or blends of such materials. Preferably, the dried mica mat is immersed in the heated liquid wax for a period sufficient to insure complete impregnation. It has been found that if the bonded reconstituted mica is heated initially to a slightly higher temperature than the impregnating wax before impregnation is undertaken, a vacuum effect is produced in the mica which facilitates its impregnation. After impregnating for a sufficient time, the material is removed, drained and any excess waxy material removed.

It has been found that bonded reconstituted mica so treated can be sawed and otherwise machined using the usual liquid cutting coolants such as water-oil emulsions, etc. directly to smooth final dimensions without the laborious filing or other finishing treatment which is necessary when ordinarily bonded reconstituted mica is employed. When slightly rougher machining can be tolerated, the liquid coolant can be dispensed with, the wax-like impregnant serving as a lubricant. Moreover, in this respect the material of the present invention lend themselves very readily to the expeditious production of mica structures such as top sticks, slot wedges, spacer boards, mounting boards and the like. It has also been found that the present treatment far and away diminishes the moisture susceptibility of the mica as compared to the untreated material. Likewise, resistance to delamination at elevated temperatures after exposure to water or humidity is greatly enhanced. When the ceraceous impregnant is not desired in the final product, it can be evaporated off by heating to leave accurately machined bonded mica mat which is free from volatiles.

The following will illustrate the practice of the invention, it being realized that these examples are not to be taken as limiting in any way but are merely illustrative of the potentialities of the present products.

A laminate of reconstituted mica about 100 mils thick and impregnated with a borate-phosphate binder according to the teaching of application Serial No. 16,882, cited above, was dried at a temperature of 315° C. for one-half hour. Other temperatures and times of treatment can be used for removing moisture and these will occur to those skilled in the art. With the temperature of the material lowered to 150° C., it was immersed in a molten paraffin bath at 100° C. It is believed, as pointed out above, that the initially higher temperature of the reconstituted mica laminate as compared to the bath enhances its initial impregnation with the wax. The paraffin bath temperature then was raised to 150° C. and the reconstituted mica allowed to soak therein for about 16 hours. The laminate was then removed, drained and excess wax removed therefrom. While the above treatment insures substantially complete impregnation of the laminate, it will be realized that said impregnation is essentially of a time-temperature nature and that these factors may be varied as desired within reasonable limits.

It was found that whereas untreated laminates of the type described pick up from about 7 percent to 9 percent of their weight in water when immersed in water for 24 hours at room temperature, the treated materials even after immersion for 147 hours under like conditions had picked up less than 0.1 percent of their weight in water. When untreated materials were exposed for 24 hours to an atmosphere having a relative humidity of 96 percent, they picked up about 0.2 percent of their weight in water. However, materials treated according to this invention and subjected to the same 96 percent relative humidity test showed no measurable pick-up of water after 24 hours.

Along with the greatly enhanced moisture resistance afforded by the present treatment, it was unexpectedly found that the physical strength and the machinability of the materials were much improved in a most unexpected manner. For example, whereas untreated materials after water immersion readily delaminate when exposed to a temperature of 600° F., the present materials show much improved delamination resistance. For example, when the present laminates were cycled for 24 hours, immersion in water at ambient temperature to one-half hour at 600° F., four cycles of such treatment were required before any delamination occurred. When treated samples were tested for flexural strength, it was also found unexpectedly that they had a flexural strength of 35,000 p.s.i. as compared to only 27,900 p.s.i. for the untreated laminates.

When the treated laminates of this invention were shaped as by sawing, it was unexpectedly found that they could be sawed to final dimensions without further filing or other finishing, particularly when a liquid coolant was used, to produce a smooth cut surface. This is in direct contradistinction to like materials not treated with a waxy substance, which must be dry sawed and must be laboriously filed or sanded to produce a smooth final dimension. The drying step can be eliminated, if desired, when machinability alone is desired.

As pointed out above, the present materials can be used in many applications where moisture resistance, electrical insulating qualities, easy machinability and good physical ruggedness are required. They are particularly useful for electrical insulation and in this connection they are useful for top sticks, slot wedges and spacers, among other applications. They are also useful for mounting boards for electronic or other electrical equipment. When the ceraceous material is not desired in the final structure, it can, after machining to final dimension, be evaporated off. There is thus provided an easy method for producing and machining such structures where the ceraceous material is not desired in the final structure. Other uses will occur to those skilled in the art.

What I claim as new and desire to secure by Letters Patent of the United States is:

1. A machinable bonded reconstituted mica laminate impregnated with a ceraceous material.
2. A machinable inorganic bonded reconstituted mica laminate impregnated with a ceraceous material.
3. A machinable organic bonded reconstituted mica laminate impregnated with a ceraceous material.
4. A machinable structure comprising bonded reconstituted mica impregnated with a ceraceous material.
5. A machinable structure comprising reconstituted mica bonded with an organic binder and impregnated with a ceraceous material.
6. A machinable structure comprising reconstituted mica bonded with an inorganic binder and impregnated with paraffin.
7. The process of impregnating a bonded reconstituted mica structure with a ceraceous material to render it machinable which comprises heating said reconstituted mica to a temperature of about 315° C. for a period of time sufficient to dry said bonded reconstituted mica, lowering the temperature of said reconstituted mica to about 150° C., immersing it in a bath of molten ceraceous material at about 100° C., and raising the temperature of said bath to about 150° C.
8. The process of impregnating bonded reconstituted mica laminate with a ceraceous material to render it machinable which comprises drying said reconstituted mica and immersing it in molten ceraceous material.
9. The process of improving the moisture resistance of bonded reconstituted mica laminate which comprises drying it and impregnating it with a ceraceous material to render it machinable.
10. The process of improving the machinability of bonded reconstituted mica which comprises impregnating it with a ceraceous material.
11. The process of producing bonded reconstituted mica structures of accurate, smooth dimension which comprises impregnating said bonded reconstituted mica with a ceraceous material, machining to final shape and volatilizing said ceraceous material.
12. The process of producing bonded reconstituted mica structures of accurate, smooth dimensions which comprises impregnating said bonded reconstituted mica with a ceraceous material, and machining to final shape.
13. The process of producing bonded reconstituted mica structures of accurate, smooth dimensions which comprises drying said bonded reconstituted mica, impregnating with a ceraceous material and machining to final shape.

References Cited by the Examiner

UNITED STATES PATENTS

| | | | |
|---|---|---|---|
| 719,973 | 2/03 | Wotton | 117—168 |
| 829,801 | 8/06 | Pratt et al. | 29—424 |
| 1,235,895 | 8/17 | Herbein | 117—4 X |
| 1,286,057 | 11/18 | Moore | 117—68 X |
| 1,574,562 | 2/26 | Oreher | 117—168 X |
| 1,694,276 | 12/28 | Mohrle | 117—168 X |
| 1,775,136 | 9/30 | Neumann | 117—168 X |
| 2,020,468 | 11/35 | Hobrock | 117—168 X |
| 2,049,370 | 7/36 | Groton | 117—168 X |
| 2,054,356 | 9/36 | Boughton et al. | |
| 2,167,215 | 7/39 | Leary | 29—424 |
| 2,203,937 | 6/40 | Barley | 29—424 X |
| 2,208,232 | 7/40 | Smolak. | |
| 2,381,163 | 8/45 | Hanford. | |
| 2,436,819 | 3/48 | Neidorf | 29—424 X |
| 2,443,663 | 6/48 | Rider et al. | |
| 2,484,641 | 10/49 | O'Hara | 125—24 X |
| 2,549,880 | 4/51 | Bardet | 156—27 |
| 2,663,928 | 12/53 | Wheeler | 29—424 |
| 2,704,261 | 3/55 | Comeford. | |
| 2,855,664 | 10/58 | Griffith et al. | 29—424 |
| 2,914,107 | 11/59 | Gaines. | |
| 2,984,897 | 5/61 | Godfrey | 29—424 |

FOREIGN PATENTS

| | | |
|---|---|---|
| 2,532 | 1882 | Great Britain. |
| 614,940 | 3/55 | Great Britain. |

OTHER REFERENCES

Warren, H.: Electrical Insulating Materials, Ernest Benn Ltd., London, 1931 (pages 48, 150, 151, and 153 relied on).

RICHARD D. NEVIUS, *Primary Examiner.*